United States Patent
Alexander et al.

(10) Patent No.: US 7,419,602 B2
(45) Date of Patent: Sep. 2, 2008

(54) SELENIUM REMOVAL FROM WATER

(75) Inventors: Roosevelt Alexander, Vallejo, CA (US); Charles J. Lord, Bartlesville, OK (US); Steven C. Mitchell, Lafayette, CA (US)

(73) Assignee: ConocoPhillips Company, Houston, TX (US)

( * ) Notice: Subject to any disclaimer, the term of this patent is extended or adjusted under 35 U.S.C. 154(b) by 326 days.

(21) Appl. No.: 11/284,856

(22) Filed: Nov. 22, 2005

(65) Prior Publication Data

US 2007/0114185 A1   May 24, 2007

(51) Int. Cl.
*C02F 1/54* (2006.01)
*C02F 1/58* (2006.01)
*C02F 1/24* (2006.01)
*C02F 101/18* (2006.01)

(52) U.S. Cl. .......... 210/705; 210/725; 210/727; 210/904; 210/911; 210/912; 423/493; 423/509

(58) Field of Classification Search .......... 210/911
See application file for complete search history.

(56) References Cited

U.S. PATENT DOCUMENTS

| | | | | |
|---|---|---|---|---|
| 4,806,264 A | | 2/1989 | Murphy | 210/695 |
| 5,089,141 A | * | 2/1992 | Murphy | 210/719 |
| 5,993,667 A | | 11/1999 | Overman | 210/709 |
| 6,033,572 A | | 3/2000 | Yano | 210/631 |
| 6,156,191 A | | 12/2000 | Overman | 210/96.1 |
| 6,214,238 B1 | | 4/2001 | Gallup | 210/717 |
| 6,635,182 B1 | * | 10/2003 | Coleman, Jr. | 210/705 |
| 7,138,063 B1 | * | 11/2006 | Teter et al. | 210/717 |

* cited by examiner

*Primary Examiner*—Peter A. Hruskoci
(74) *Attorney, Agent, or Firm*—Jeffrey R. Anderson

(57) ABSTRACT

A process for removing selenium from a water stream, in particular a waste water stream, by: 1) the addition thereto of a ferric salt, followed by 2) the addition of a cupric salt and pH adjustment to a pH value in the range of from about 6.5 to about 8.0, thereby forming a copper-and-selenium-containing precipitate, and 3) removing the copper-and-selenium-containing precipitate to thereby form a treated water stream, is disclosed. The optional precipitation and removal of excess copper ions is also disclosed.

17 Claims, No Drawings

SELENIUM REMOVAL FROM WATER

The present invention relates to a process for the removal of selenium compound(s) from a water stream. In another aspect, this invention relates to a process for the removal of selenocyanate from a waste water stream.

Selenium is naturally present in crude oils (especially sour crude oils) and coals produced or mined from formations containing seleniferous marine shales. During the refining of such crude oils and the processing of such coals, such as coal gasification, the process water generated can contain large amounts of selenium. The selenium is usually in the form of the selenocyanate ion although oxidized species of the selenium, such as selenite and selenate, may be present in lesser amounts.

Due to the documented deleterious effects of selenium on the environment, governmental agencies responsible for regulating waste water discharges have instituted regulations limiting the concentration of selenium allowed to be present in such discharges. Such limits can be as low as 5 parts per billion.

Achieving such selenium limits has proven to be very difficult and costly to industry. Therefore, development of an improved process for effectively and efficiently removing selenium from water, and especially from waste water, would be a significant contribution to the art.

BRIEF SUMMARY OF THE INVENTION

It is, thus, an object of the present invention to provide an improved process for removing selenium from a water stream.

A further object of this invention is to provide an improved process for removing selenocyanate ions from a waste water stream.

In accordance with the present invention, a process is provided including the following steps:
  adding a ferric salt to a feed stream comprising water and at least one selenium compound to thereby form a first intermediate stream;
  adding a cupric salt to the first intermediate stream to thereby form a second intermediate stream;
  adjusting the pH of the second intermediate stream to a pH value in the range of from about 6.5 to about 8.0 in order to maximize the reaction of the cupric salt with the at least one selenium compound to thereby form a copper-and-selenium-containing precipitate; and
  removing the copper-and-selenium-containing precipitate from the second intermediate stream to thereby form a treated water stream.

DETAILED DESCRIPTION OF THE INVENTION

According to the present invention, the feed stream comprises, consists of, or consists essentially of water and at least one selenium compound. The feed stream can also comprise, consist of, or consist essentially of water, at least one selenium compound and organic contaminants such as phenols and acids. At least one selenium compound present in the feed stream is typically selected from the group consisting of selenocyanate ion, selenite ion, selenate ion, and combinations thereof. Most typically, the selenium compound is a selenocyanate ion. The selenium concentration of the feed stream is typically greater than about 500 ppbw, more typically greater than 2000 ppbw, and most typically greater than about 3000 ppbw, on an elemental selenium basis.

A ferric salt is added to the feed stream to thereby form a first intermediate stream. The amount of ferric ion added to the feed stream ranges from about 0.003 milligrams per milliliter to about 0.07 milligrams per milliliter, preferably from about 0.006 milligram per milliliter to about 0.048 milligrams per milliliter, and more preferably from about 0.03 milligram per milliliter to about 0.041 milligrams per milliliter of feed stream. The ferric salt comprises a salt selected from the group consisting of ferric halide, ferric nitrate, ferric sulfate, and combinations thereof. More preferably, the ferric salt is ferric chloride.

A cupric salt is then added to the first intermediate stream to thereby form a second intermediate stream. The cupric salt comprises a salt selected from the group consisting of cupric halide, cupric nitrate and cupric sulfate. More preferably, the cupric salt is either cupric chloride or cupric sulfate. Most preferably, the cupric salt is cupric sulfate. The cupric salt is preferably added to the first intermediate stream in a stoichiometric excess relative to the amount of selenium compound(s) which is/are present in the first intermediate stream.

The pH of the second intermediate stream is then adjusted to a pH value in the range of from about 6.5 to about 8.0, preferably in the range of from about 7.0 to about 8.0, and most preferably in the range of from about 7.0 to about 7.5, in order to maximize the reaction of cupric salt with the selenium compound(s) to thereby form a copper-and-selenium-containing precipitate. The copper-and-selenium-containing precipitate is most likely cuprous selenocyanate. The pH of said second intermediate stream is adjusted by either adding an acid or a base to said second intermediate stream. The acid useful in adjusting the pH of the second intermediate stream comprises a member selected from the group consisting of sulfuric acid, hydrochloric acid, nitric acid, and combinations thereof, and the base useful in adjusting the pH in the second intermediate stream comprises a member selected from the group consisting of sodium hydroxide, potassium hydroxide, calcium hydroxide, and combinations thereof.

The copper-and-selenium-containing precipitate is then removed from the second intermediate stream to thereby form a treated water stream. The selenium concentration of the treated stream is preferably less than about 20 ppbw and most preferably less than about 10 ppbw, on an elemental selenium basis.

More particularly, the step of removing the copper-and-selenium-containing precipitate from the second intermediate stream can comprise the following steps. A polymer is added to the second intermediate stream for flocculation with the copper-and-selenium-containing precipitate thereby forming a third intermediate stream comprising floccules of the polymer and the copper-and-selenium-containing precipitate. The polymer useful in this invention can be any polymer capable of forming floccules with the copper-and-selenium-containing precipitate. The third intermediate stream is then passed to a dissolved air flotation unit comprising a liquid holding tank which can be externally agitated. Fine air bubbles are introduced to the air flotation unit for passage up through the third intermediate stream for contact with the floccules to thereby form a froth comprising the floccules which rises to the top of the air flotation unit. The froth is then removed from the third intermediate stream to thereby form a waste froth stream and the treated water stream.

The treated water stream can be further treated as follows. A water soluble compound, having an ion which reacts with cupric or cuprous ions, is added to the treated water stream in a stoichiometric excess based on the amount of unreacted cupric or cuprous ions present in the treated water stream thereby forming a copper precipitate. The copper precipitate is then removed from the treated water stream. Preferably, the water soluble compound comprises a compound selected from the group consisting of a sulfide salt, a carbamate, a thiocarbonate, and combinations thereof. Preferably, the sulfide salt comprises a compound selected from the group consisting of ferrous sulfide, ammonium sulfide, sodium sulfide, sodium polysulfide, potassium sulfide, magnesium sulfide, calcium sulfide, barium sulfide, and combinations thereof.

The following examples are provided to further illustrate this invention and are not to be considered as unduly limiting the scope of this invention.

EXAMPLES

Each batch test was run using either one or two liter samples of wastewater obtained from a refinery. A 25 wt. % copper sulfate solution was used to add copper sulfate to the wastewater. A 32 wt. % ferric chloride solution was used to add ferric chloride to the wastewater.

Example 1

The wastewater samples for Runs 1-4 were each 1 liter and each contained between 3 and 4 mg/L Se, on an elemental Se basis.

Runs 1 and 2 (Control):

The copper sulfate was added to the one liter of wastewater followed by the addition of ferric chloride. The pH was adjusted by the addition of sodium hydroxide with a target of around 7.5. A 1-2 ppm quantity of neat cationic polymer was then added to the solution to aid in the removal of precipitates from the solution. The clarified solution was then tested for pH, Se and Cu content.

Runs 3 and 4 (Inventive):

The ferric chloride was added to the one liter of wastewater followed by the addition of copper sulfate. The pH was adjusted by the addition of sodium hydroxide with a target of around 7.5. A 1-2 ppm quantity of neat cationic polymer was then added to the solution to aid in the removal of precipitates from the solution. The clarified solution was then tested for pH, Se and Cu content.

TABLE 1

| Run No. | Se in Feed mg/L | CuSo$_4$ Addition mg/L | Fe Cl$_3$ Addition mg/L | pH of final solution | Cu in final solution mg/L | Se in final solution mg/L |
|---|---|---|---|---|---|---|
| 1(control) | 3-4 | ~3000 | ~300 | 7.3 | 24.0 | 0.260 |
| 2(control) | 3-4 | ~4000 | ~300 | 7.1 | 17.0 | 0.180 |
| 3(inventive) | 3-4 | ~3000 | ~300 | 7.2 | 23.0 | 0.075 |
| 4(inventive) | 3-4 | ~4000 | ~300 | 7.4 | 16.0 | 0.073 |

As shown in Table 1, the addition of ferric chloride to the wastewater prior to the addition of the copper sulfate resulted in much lower concentrations of Se in the final solution as compared to the process of the control runs wherein the order of addition was reversed.

Example 2

The wastewater samples for Runs 5-9 were each 1 liter and each contained between 3 and 4 mg/L Se, on an elemental Se basis.

Run 5 (Control):

The copper sulfate was added to the one liter of wastewater without the addition of ferric chloride. Sodium hydroxide was added to the solution until precipitate formation was first observed which occurred at a pH of around 6.5. A 1-2 ppm quantity of neat cationic polymer was then added to the solution to aid in the removal of precipitates from the solution. The clarified solution was then tested for Se and Cu content.

Run 6 (Control)

The copper sulfate was added to the one liter of wastewater and sodium hydroxide was added to the solution until precipitate formation was first observed which occurred at a pH of around 6.5. The ferric chloride was then added to the solution and sodium hydroxide was again added to the solution until the pH was around 6.7. A 1-2 ppm quantity of neat cationic polymer was then added to the solution to aid in the removal of precipitates from the solution. The clarified solution was then tested for Se and Cu content.

Run 7 (Control)

The copper sulfate was added to the one liter of wastewater and sodium hydroxide was added to the solution until the pH of the solution was around 9.0. The ferric chloride was then added to the solution and sodium hydroxide was again added to the solution until the pH was around 6.5. A 1-2 ppm quantity of neat cationic polymer was then added to the solution to aid in the removal of precipitates from the solution. The clarified solution was then tested for Se and Cu content.

Run 8 (Inventive)

The ferric chloride was added to the one liter of wastewater followed by the addition of the copper sulfate. Sodium hydroxide was added to the solution until precipitate formation was first observed which occurred at a pH of around 6.4. A 1-2 ppm quantity of neat cationic polymer was then added to the solution to aid in the removal of precipitates from the solution. The clarified solution was then tested for Se and Cu content.

Run 9 (Inventive)

The ferric chloride was added to the one liter of wastewater followed by the addition of the copper sulfate. Sodium hydroxide was added to the solution until precipitate formation was first observed which occurred at a pH of around 7.0. A 1-2 ppm quantity of neat cationic polymer was then added to the solution to aid in the removal of precipitates from the solution. The clarified solution was then tested for Se and Cu content.

TABLE 2

| Run No. | Se in Feed mg/L | CuSO4 Addition mg/L | Fe Cl3 Addition mg/L | pH of final solution | Cu in final solution mg/L | Se in final solution mg/L |
|---|---|---|---|---|---|---|
| 5(control) | 3-4 | ~3000 | — | 6.5 | 82.0 | 0.0260 |
| 6(control) | 3-4 | ~2000 | ~100 | 6.7 | 49.0 | 0.950 |
| 7(control) | 3-4 | ~1500 | ~200 | 6.5 | 2.80 | 0.079 |
| 8(inventive) | 3-4 | ~2000 | ~100 | 6.4 | 59.0 | 0.043 |
| 9(inventive) | 3-4 | ~2000 | ~100 | 7.0 | 18.0 | 0.032 |

As shown in Table 2, inventive Runs 8 and 9 showed better overall reduction of Se and Cu levels as compared to control Runs 5 and 6. While Control Run 7 showed good Se and Cu reduction in its final solution, the process to produce such results involved wide pH swings for the solution which would not be practical in industry.

Example 3

The wastewater samples for Runs 10-11 were each 2 liters and each contained 0.78 mg/L Se, on an elemental Se basis. For Runs 12 and 13, 1 liter samples of the final solutions from Runs 10 and 11 were used as the feeds, respectively.

Run 10 (Inventive)

The ferric chloride was added to the two liters of wastewater followed by the addition of the copper sulfate. Sodium hydroxide was added to the solution until precipitate formation was first observed which occurred at a pH of around 8.5. A 1-2 ppm quantity of neat cationic polymer was then added to the solution to aid in the removal of precipitates from the solution. The clarified solution was then tested for Se and Cu content.

Run 11 (Control):

The copper sulfate was added to the two liters of wastewater without the addition of ferric chloride. Sodium hydroxide was added to the solution until precipitate formation was first observed which occurred at a pH of around 8.4. A 1-2 ppm quantity of neat cationic polymer was then added to the solution to aid in the removal of precipitates from the solution. The clarified solution was then tested for pH, Se and Cu content.

Run 12 (Inventive)

A 100 ppmv quantity of a carbamate was added to one liter of the final solution from Run 10. A 1-2 ppm quantity of neat anionic polymer was then added to the solution to aid in the removal of precipitates from the solution. The clarified solution was then tested for pH, Se and Cu content.

Run 13 (Control)

A 100 ppmv quantity of a carbamate was added to one liter of the final solution from Run 11. A 1-2 ppm quantity of neat anionic polymer was then added to the solution to aid in the removal of precipitates from the solution. The clarified solution was then tested for pH, Se and Cu content.

TABLE 3

| Run No. | Se in Feed mg/L | CuSo4 Addition mg/L | FeCl3 Addition mg/L | pH of final solution | Cu in final solution mg/L | Se in final solution mg/L |
|---|---|---|---|---|---|---|
| 10(inventive) | 0.780 | ~2000 | ~100 | 8.5 | 2.08 | 0.078 |
| 11(control) | 0.780 | ~2000 | — | 8.4 | 2.19 | 0.075 |
| 12(inventive) | 0.078 | — | — | 8.6 | 0.060 | 0.046 |
| 13(control) | 0.075 | — | — | 8.4 | 0.080 | 0.056 |

As shown in Table 3, with a relatively low concentration of Se in the feed, the effect of ferric chloride addition in Run 10 does not seem to provide an advantage over the control process of Run 11 without ferric chloride addition. Also shown in Table 3 is that the addition of a carbamate in a subsequent step followed by addition of an anionic polymer resulted in very good copper reduction, and even lower Se levels.

Example 4

The wastewater samples for Runs 14-17 were each 1 liter and each contained around 1.40 mg/L Se, on an elemental Se basis.

Run 14 (Control):

The copper sulfate was added to the one liter of wastewater without the addition of ferric chloride. Sodium hydroxide was added to the solution until precipitate formation was first observed which occurred at a pH of around 8.0. A 1-2 ppm quantity of neat cationic polymer was then added to the solution to aid in the removal of precipitates from the solution. The clarified solution was then tested for pH, Se and Cu content.

Runs 15-17 (Inventive)

The ferric chloride was added to the one liter of wastewater followed by the addition of the copper sulfate. Sodium hydroxide was added to the solution until precipitate formation was first observed which occurred at a pH of around 7.1, 7.6 and 7.1, for Runs 15-17, respectively. A 1-2 ppm quantity of neat cationic polymer was then added to the solution to aid in the removal of precipitates from the solution. The clarified solution was then tested for pH, Se and Cu content.

TABLE 4

| Run No. | Se in Feed mg/L | CuSO₄ Addition mg/L | Fe Cl₃ Addition mg/L | pH of final solution | Cu in final solution mg/L | Se in final solution mg/L |
|---|---|---|---|---|---|---|
| 14(control) | 1.40 | ~3000 | — | 8.1 | 4.30 | 0.310 |
| 15(inventive) | 1.40 | ~3000 | ~50 | 7.1 | 6.00 | 0.160 |
| 16(inventive) | 1.40 | ~3000 | ~100 | 7.4 | 4.80 | 0.200 |
| 17(inventive) | 1.40 | ~3000 | ~200 | 6.7 | 6.90 | 0.077 |

As shown in Table 4, inventive Runs 15-17 showed significantly lower Se concentrations in their final solutions as compared to control Run 14 which did not include the addition of ferric chloride to the wastewater sample.

While this invention has been described in detail for the purpose of illustration, it should not be construed as limited thereby but intended to cover all changes and modifications within the spirit and scope thereof.

That which is claimed is:

1. A process comprising:
    adding a ferric salt to a feed stream comprising water and selenocyanate to thereby form a first intermediate stream, wherein at least about 0.003 milligrams of said ferric salt are added to said feed stream;
    adding a cupric salt to said first intermediate stream to thereby form a second intermediate stream;
    adjusting the pH of said second intermediate stream to a pH value in the range of from about 6.5 to about 8.0 in order to maximize the reaction of said cupric salt with said selenocyanate to thereby form a copper-adding a polymer to said second intermediate stream for flocculation with said copper-and-selenium-containing precipitate thereby forming a third intermediate stream comprising floccules of said polymer and said copper-and-selenium-containing precipitate; and-selenium-containing precipitate; and
    removing said floccules-and-selenium-containing floccules from said third intermediate stream to thereby form a treated water stream.

2. A process in accordance with claim 1 wherein said ferric salt comprises a salt selected from the group consisting of ferric halide, ferric nitrate, or ferric sulfate, and combinations thereof.

3. A process in accordance with claim 1 wherein said ferric salt is ferric chloride.

4. A process in accordance with claim 1 wherein said cupric salt comprises a salt selected from the group consisting of cupric halide, cupric nitrate and cupric sulfate.

5. A process in accordance with claim 1 wherein said cupric salt is cupric chloride.

6. A process in accordance with claim 1 wherein said cupric salt is cupric sulfate.

7. A process in accordance with claim 1 wherein said cupric salt is added to said first intermediate stream in a stoichiometric excess relative to the amount of said selenocyanate present in said first intermediate stream.

8. A process in accordance with claim 1 wherein in the range of from about 0.003 milligrams to about 0.07 milligrams of said ferric salt are added per milliliter of said feed stream.

9. A process in accordance with claim 1 wherein the pH of said second intermediate stream is adjusted by either adding an acid or a base to said second intermediate stream.

10. A process in accordance with claim 9 wherein said acid comprises a member selected from the group consisting of sulfuric acid, hydrochloric acid, nitric acid, and combinations thereof, and wherein said base comprises a member selected from the group consisting of sodium hydroxide, potassium hydroxide, calcium hydroxide, and combinations thereof.

11. A process in accordance with claim 1 wherein the pH of said second intermediate stream is adjusted to a pH value in the range of from about 7.0 to about 8.0.

12. A process in accordance with claim 1 wherein the selenium concentration of said feed stream is greater than about 500 ppbw, on an elemental selenium basis.

13. A process in accordance with claim 1 wherein the selenium concentration of said treated stream is less than about 20 ppbw, on an elemental selenium basis.

14. A process in accordance with claim 1 wherein the step of removing said copper-and-selenium-containing precipitate comprises the steps of:
    a polymer to said second intermediate stream for flocculation with said copper-and-selenium-containing thereby forming a third intermediate stream comprising floccules of said polymer and said copper-and-selenium-containing
    passing said third intermediate stream to a dissolved air flotation unit;
    introducing fine air bubbles to said air flotation unit for passage up through said third intermediate stream for contact with said floccules to thereby form a froth comprising said floccules which rises to the top of said air flotation unit; and
    removing said froth from said third intermediate stream to thereby form said treated water stream.

15. A process in accordance with claim 1 wherein:
    a water soluble compound, having an ion which reacts with cupric or cuprous ions, is added to said treated water stream in a stoichiometric excess based on the amount of unreacted cupric or cuprous ions present in said treated water stream thereby forming a copper precipitate; and
    said copper precipitate is removed from said treated water.

16. A process in accordance with claim 15 wherein said water soluble compound comprises a compound selected from the group consisting of a sulfide salt, a carbamate, a thiocarbonate, and combinations thereof.

17. A process in accordance with claim 16 wherein said sulfide salt comprises a compound selected from the group consisting of ferrous sulfide, ammonium sulfide, sodium sulfide, sodium polysulfide, potassium sulfide, magnesium sulfide, calcium sulfide, barium sulfide, and combinations thereof.

* * * * *